United States Patent
Takatori

(10) Patent No.: US 8,706,042 B2
(45) Date of Patent: Apr. 22, 2014

(54) TRANSMIT PHASE CONTROL FOR THE ECHO CANCEL BASED FULL DUPLEX TRANSMISSION SYSTEM

(75) Inventor: Hiroshi Takatori, Sacramento, CA (US)

(73) Assignee: Futurewei Technologies, Inc., Plano, TX (US)

( * ) Notice: Subject to any disclaimer, the term of this patent is extended or adjusted under 35 U.S.C. 154(b) by 155 days.

(21) Appl. No.: 13/464,708

(22) Filed: May 4, 2012

(65) Prior Publication Data

US 2012/0281603 A1 Nov. 8, 2012

Related U.S. Application Data

(60) Provisional application No. 61/483,362, filed on May 6, 2011.

(51) Int. Cl.
*H04B 1/00* (2006.01)

(52) U.S. Cl.
USPC .......................................... 455/63.1; 375/375

(58) Field of Classification Search
USPC .......... 455/63.1, 67.13, 69, 73; 370/282, 293; 375/375, 220, 107, 108, 109, 354, 355, 375/358, 371

See application file for complete search history.

(56) References Cited

U.S. PATENT DOCUMENTS

| | | | |
|---|---|---|---|
| 5,311,503 A * | 5/1994 | Kokubo et al. | 370/290 |
| 5,864,592 A | 1/1999 | Itri | |
| 6,240,128 B1 * | 5/2001 | Banerjea et al. | 375/222 |
| 6,456,651 B1 | 9/2002 | Pilozzi et al. | |
| 7,068,726 B1 | 6/2006 | Zortea | |
| 7,187,719 B2 | 3/2007 | Zhang | |

OTHER PUBLICATIONS

"Information Technology—Telecommunications and Information Exchange Between Systems—Local and Metropolitan Area Networks—Specific Requirements—Supplement to Carrier Sense Multiple Access with Collision Detection (CSMA/CD) Access Method and Physical Layer Specifications—Physical Layer Parameters Over 4-Pair of Category 5 Balanced Copper Cabling, Type 1000BAST-T," IEEE Standard 802.3ab—1999, Supplement to IEEE Std 802.3 1998 Edition, Jun. 26, 1999, 140 pages.
Foreign communication from a Counterpart Application, PCT Application No. PCT/US2012/036622, International Search Report mailed Aug. 21, 2012, 5 pages.
Foreign communication from a Counterpart Application, PCT Application No. PCT/US2012/036622, Written Opinion mailed Aug. 21, 2012, 10 pages.
Gao, et al., "A New Structure, 200-MHz, -60dB Distortion Linedriver for 1000base-T Ethernet," Internet Article, Oct. 23, 2001, pp. 274-277.
"Startup Resolutions for 1000BAST-T; srfeb98," IEEE Draft; SRFE98, IEEE-SA Piscataway, NJ, vol. 802.3, Retrieved from the Internet Sep. 3, 1998, pp. 1-19.
Lin, et al., "Full-Duplex Data Over Local Loops," IEEE Communications Magazine, IEEE Service Center, Piscataway, NJ, vol. 26, No. 2, Feb. 1, 1988, pp. 31-42.

* cited by examiner

*Primary Examiner* — Brenda H Pham
(74) *Attorney, Agent, or Firm* — Conley Rose, P.C.; Grant Rodolph; Rayhao Chung

(57) ABSTRACT

A network component comprising a transmitter configured to transmit data at a transmitter phase, a receiver configured to receive data at a receiver, and a phase delay component coupled to the transmitter and the receiver and configured to control the transmitter phase relative to the receiver phase to maintain distortion in the transmitted data below a threshold, wherein the threshold is less than a maximum possible distortion in the transmitted data.

20 Claims, 7 Drawing Sheets

TRANSMIT PHASE CONTROL FOR THE ECHO CANCEL BASED FULL DUPLEX TRANSMISSION SYSTEM

CROSS-REFERENCE TO RELATED APPLICATIONS

The present application claims the benefit of U.S. Provisional Patent Application No. 61/483,362 filed May 6, 2011 by Hiroshi Takatori and entitled "Transmit Phase Control for Echo Cancel Based Full Duplex Transmission System," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A full-duplex transmission system, also referred to as a double-duplex transmission system, allows communications on the same link between two components in both directions simultaneously or effectively simultaneously. For example, landline telephone and mobile phone networks are full duplex, since they allow both callers to speak and be heard at the same time. Some full-duplex systems also use clock sources for synchronizing communications. In a master/slave timing scheme, also referred to as a loop timing scheme, a slave clock (at a slave node) receives its timing from a master clock (at a master node). For example, the slave node may be a customer node and the master node may be a network node. The master clock provides an accurate timing source, which is used to send signals from the master node to the slave node. The signals are received and used to synchronize the slave clock with the master clock, and thus synchronize or align the master/slave clocks and transmissions between the two nodes.

SUMMARY

In one embodiment, the disclosure includes an apparatus comprising a transmitter configured to transmit data at a transmitter phase, a receiver configured to receive data at a receiver, and a phase delay component coupled to the transmitter and the receiver and configured to control the transmitter phase relative to the receiver phase to maintain distortion in the transmitted data below a threshold, wherein the threshold is less than a maximum possible distortion in the transmitted data.

In another embodiment, the disclosure includes a network component for an echo cancel based full duplex transmission system, comprising a transmitter configured to transmit data to a master node at a slave transmitter phase via a full duplex channel, a receiver configured to receive data from the master node at a slave receiver phase via the full duplex channel, and a processor configured to adjust the slave transmitter phase with respect to the slave receiver phase based on status information exchanged with the master node.

In yet another embodiment, the disclosure includes a method implemented by at least one of a slave node and a master node in an echo cancel based full duplex transmission system that implements a loop timing scheme, comprising detecting a phase of a received signal, detecting a distortion level of a transmitted signal, determining a relative phase between the received signal and the transmitted signal that meets a threshold if the detected distortion level is above the threshold, and introducing a phase delay to the transmitted signal to achieve the determined relative phase between the received signal and the transmitted signal and lower the distortion level below the threshold.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
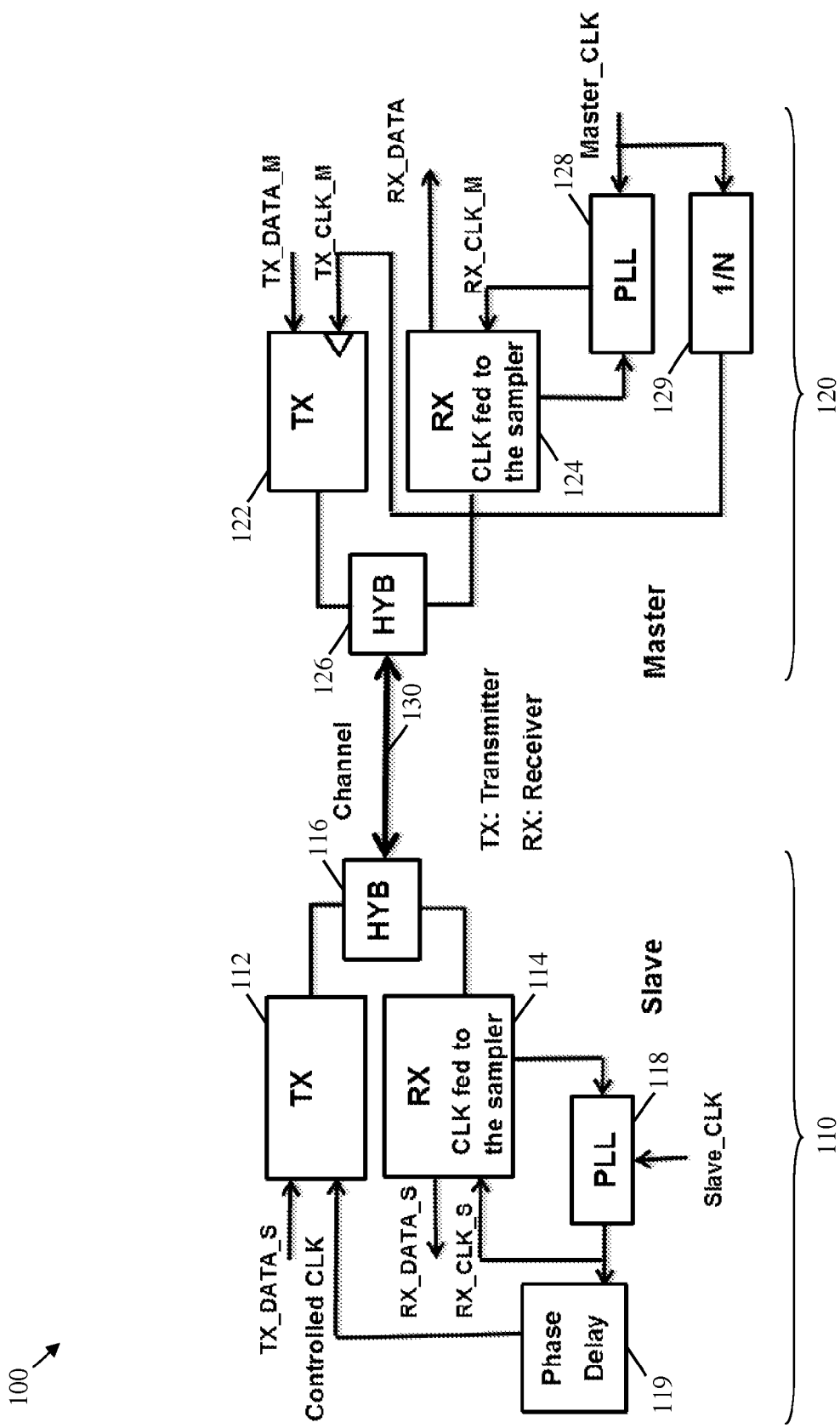
FIG. 1 is a schematic diagram of an embodiment of a loop-timed clocking system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Gigabit Ethernet Physical Layer (GEPHY) standard is defined in the Institute of Electrical and Electronics Engineers (IEEE) standard 802.3ab, which is incorporated herein by reference, and includes an echo cancel based full duplex transmission scheme. The scheme may be used to handle the leak of a transmitted signal from the local transmitter to the local receiver (at the same component or node). The leaked signal from the local transmitter to the local receiver may be comparable in signal strength to the received signal at the receiver, and hence may cause substantial distortion or error in the received signal. According to the echo cancel based full duplex transmission scheme, the local receiver may be configured to cancel this undesired leak in transmitter signal using a suitable filter (e.g., a linear least mean squares (LMS) filter), also referred to as an echo canceller (EC). Further, to reduce power consumption in the transmitter, the local transmitter may use a class AB line driver (amplifier), which may introduce a non-linear distortion in the leaked signal. The resulting non-linear distortion in the leaked signal may cause performance degradation of the system since the EC may be capable of suppressing only the linear portion of the leaked signal.

Typically, the transmitter-introduced distortion varies with the transmitted signal amplitude and slope (the time derivative of the transmitter signal). Thus, the transmitter distortion may be a function of phase when the leaked signal is sampled. Disclosed herein is a system and method for reducing the performance degradation in an echo cancel based system, e.g., due to nonlinear distortion in transmitter leaked signal. The system and method may exploit the relation between the transmitter signal distortion and the transmitter signal phase to control the distortion in the transmitted signal, and hence improve communications performance. The system may comprise a slave node and a master node that implement a loop timing scheme to synchronize a slave clock with a master clock. The system may use a full duplex transmission scheme and the transmitter may use a class AB line driver. The system performance may be improved by controlling the transmitter phase relative to the receiver phase at the slave node to substantially reduce the performance degradation. In an embodiment, the method may be implemented as part of a control state machine that exchanges receiver status information during initiation time between a slave node and a master node.

FIG. 1 illustrates an embodiment of a loop-timed clocking system 100 that may implement a loop timing scheme for synchronizing clocks and hence transmissions between network components. The loop-timed clocking system 100 may comprise a slave node 110, and a master node 120 coupled to the slave node. The slave node 110 and the master node 120 may be a client node and a network node, respectively. Alternatively, the slave node 110 and the master node 120 may be a network edge node and a network core node, respectively. The nodes may be routers, bridges, switches, or any other network components configured to transmit and receive data (e.g., in packets or frames).

The slave node 110 and the master node 120 may be configured to communicate using a full duplex channel between the two. The slave node 110 may comprise a first transmitter 112 (TX), a first receiver 114 (RX), a first hybrid echo cancellation (HYB) component or circuit 116, a first phase-locked-loop (PLL) component or circuit 118, and a phase delay component or circuit 119. The master node 120 may comprise a second transmitter 122, a second receiver 124, a second HYB component or circuit 126, a second PLL component or circuit 128, and a 1/N divider component or circuit 129. The components of the loop-timed clocking system 100 may be arranged as shown in FIG. 1.

The first transmitter 112, and similarly the second transmitter 122, may be configured to transmit data, such as in the form of frames, packets, or other encapsulation formats, on the full duplex channel. The first receiver 114, and similarly the second receiver 124, may be configured to receive the data (in frames or other formats) on the full duplex channel. The first HYB 116, and similarly the second HYB 126, may be coupled to the local transmitter (first transmitter 112 or second transmitter 122) and the local receiver (first receiver 114 or second receiver 124). The first HYB 116 and the second HYB 126 may be configured to pass the transmitted signal from the local transmitter onto the full duplex channel, substantially isolate the transmitted signal from the local receiver, and pass the received signal on the full duplex channel onto the local receiver. The first HYB 116, and similarly the second HYB 126, may comprise or may be coupled to a class AB line driver or amplifier (not shown), which may be configured to amplify or adjust the power of the transmitted signal and reduce power consumption in the local transmitter. The first HYB 116 and similarly the second HYB 126 may also comprise an EC (not shown), such as a LMS filter, which may be configured to cancel or substantially reduce at least a linear portion of a leaked signal from the local transmitter onto the local receiver.

The first PLL circuit 118 may be coupled to the first receiver 114 and a local slave clock (not shown) at the slave node 110. The first PLL circuit 118 may be configured to track a best (or improved) phase in the received signal at the first receiver 114 using the slave clock. The first PLL circuit 118 may feed the slave clock timing signal to a sampler (not shown) at the first receiver 114 to track the phase in the received signal. Adjusting the phase in the transmitted signal and tracking the phase in the received signal may enable the synchronization of communications between the master node 120 and the slave node 110.

The 1/N divider circuit 129 may be coupled to the second transmitter 122 and a master clock (not shown) at the master node 120, and configured to determine the phase for the transmitted signals at the second transmitter 122 using the master clock. The master clock may be about N times faster than the symbol speed in the transmitted signal. The second PLL circuit 128 may be coupled to the second receiver 124 and the master clock, and configured to track a best (or improved) phase in the received signal at the second receiver 124 using the master clock. The second PLL circuit 128 may feed the master clock timing signal to a sampler (not shown) at the second receiver 124 to track the phase in the received signal.

To align the transmitted and received signals of the slave node 110 and the master node 120 and thus guarantee proper data transfer between the two, the slave clock may need to be sufficiently aligned with the master clock. This may be achieved by exchanging determined signaling, e.g., phase information or other time references, between the master node 120 and the slave node 110 to synchronize the slave clock with the master clock. The loop-timed clocking system 100 may use a loop timing scheme for synchronizing the clocks as described in IEEE standard 802.3ab-1000BASE-T or the High-bit-rate digital subscriber line (HDSL)/HDSL2 architectures of the American National Standards Institute (ANSI) T1E1.4, all of which are incorporated herein by reference.

When using an AB line driver at the first HYB 116 (and similarly the second HYB 126), the leaked signal from the first transmitter 112 to the first receiver 114 (and similarly from the second transmitter 122 to the second receiver 124) may include non-linear distortion, which may not be effectively suppressed by the EC of the first HYB 116 (or the second HYB 126). However, the non-linear distortion in the transmitted and leaked signals from the first transmitter 112 may depend on the phase of the transmitted signal. For instance, the non-linear distortion may vary according to the phase of the transmitted signal relative to the phase of the received signal at the first receiver 114. Thus, controlling the transmitter phase relative to the receiver phase at the slave node 120 (or master node 110) may reduce the non-linear distortion in the leaked signal, which may reduce errors and improve communications.

The transmitted signal phase relative to the received signal phase at the slave node 110 may be controlled using the phase delay circuit 119, which may be coupled to the first PLL circuit 118 and the first transmitter 112. The phase delay circuit 119 may be configured to introduce a phase delay for the first transmitter 112, e.g., based on the tracked phase in the received signal from the first PLL circuit 118. The introduced phase delay may be used to control or adjust the relative phase between the first transmitter 112 and the first receiver 114 to reduce the non-linear distortion in the leaked signal. In an embodiment, the 1/N divider circuit 129 may similarly introduce a phase delay for the second transmitter 122, e.g., based on the phase from the master clock. The introduced phase delay may be used to control or adjust the relative phase between the second transmitter 122 and the second receiver 124 to reduce the non-linear distortion in the leaked signal.

Figure 2:
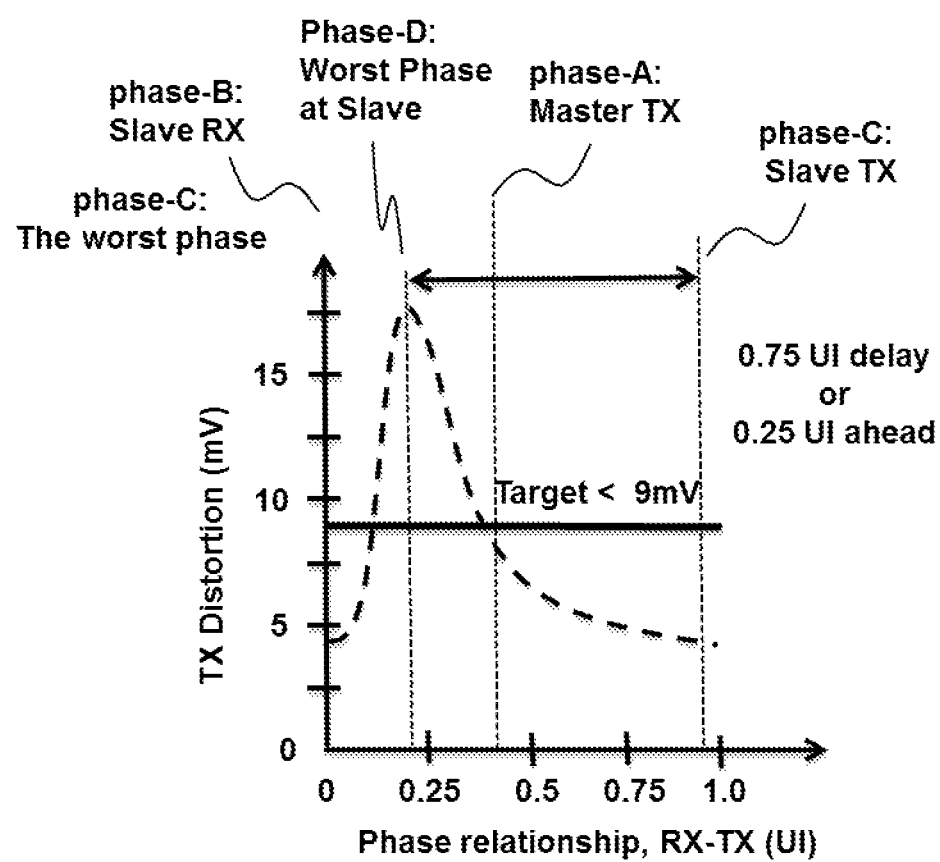
FIG. 2 is a chart of an embodiment of a signal distortion versus a relative phase relation.

FIG. 2 illustrates an embodiment of a signal distortion versus a relative phase relation 200 for a transmitted signal. The relation 200 is represented by a curve indicating the transmitted signal distortion values (at the y-axis) for a range of relative phase values (at the x-axis). The transmitted signal distortion values are represented in units of millivolt (mV) and the relative phase values are represented in unit interval (UI). The transmitted signal distortion value may be proportional to the leaked signal value from the transmitted signal at the first transmitter 112 onto the received signal at the first receiver 114. The relative phase value may correspond to the difference (or delay) between the received signal phase and the transmitted signal phase, also referred to herein as RX-TX. For instance, the phase delay circuit 119 may be used to introduce a relative phase value (on the x-axis) to the first transmitter 112 to achieve a corresponding transmitted signal distortion value (on the y-axis) and hence a corresponding leaked signal distortion value.

The curve representing the signal distortion versus a relative phase relation 200 shows that a nonlinear relation between the transmitted signal distortion and RX-TX, where the transmitted signal distortion value may reach a maximum that is substantially higher than the remaining distortion values at a RX-TX value of about 0.23 UI. This RX-TX value may correspond to an abrupt change in the transmitted signal, e.g., a change in a transmitted symbol from +1 to −1. The maximum transmitted signal distortion may not correspond to a zero RX-TX value due to a processing delay between one or more components or circuits of the slave node 110, such as a phase control circuit (at the first transmitter 112), a sampling circuit (at the first receiver 114), a line driver circuit (at the first HYB 116), and/or other circuits or components of the slave node 110.

A horizontal line that intersects the curve is also shown in FIG. 2 to represent a target for selecting an appropriate RX-TX value for introducing a suitable phase delay (by the phase delay circuit 119) between the first transmitter 112 and the first receiver 114. The threshold may be a maximum threshold or allowed value for the transmitted signal distortion, which may be for example equal to about half the maximum distortion value (at about 9 mV). As shown in FIG. 2, to meet the threshold or target value of about 9 mV (for maximum allowed distortion), the phase delay may be set in the range from zero UI to about 0.12 UI or in the range from about 0.38 UI to about 1.0 UI.

The relative phase may be controlled by adjusting the phase of the transmitted signal at the first transmitter 112 (using the phase delay circuit 119). The phase of the transmitted signal may be adjusted (with respect to the phase of the received signal at the first receiver 114) to achieve a relative phase that meets the target for transmitted signal distortion. For instance, the phase may be controlled during initial start-up time (e.g., at setup or initialization phase) prior to normal operation time (e.g. at normal data transmission phase). The phase control may be continued during normal operation time to maintain the distortion at the desired target. The loop-timed clocking system 100 may be capable of monitoring system performance conditions including transmitter distortion, such as by detecting the signal to noise ratio (SNR) of the transmitter, using one or more signal processing blocks, such as a decision feedback equalizer (DFE) and/or error detecting circuitry.

Figure 3:
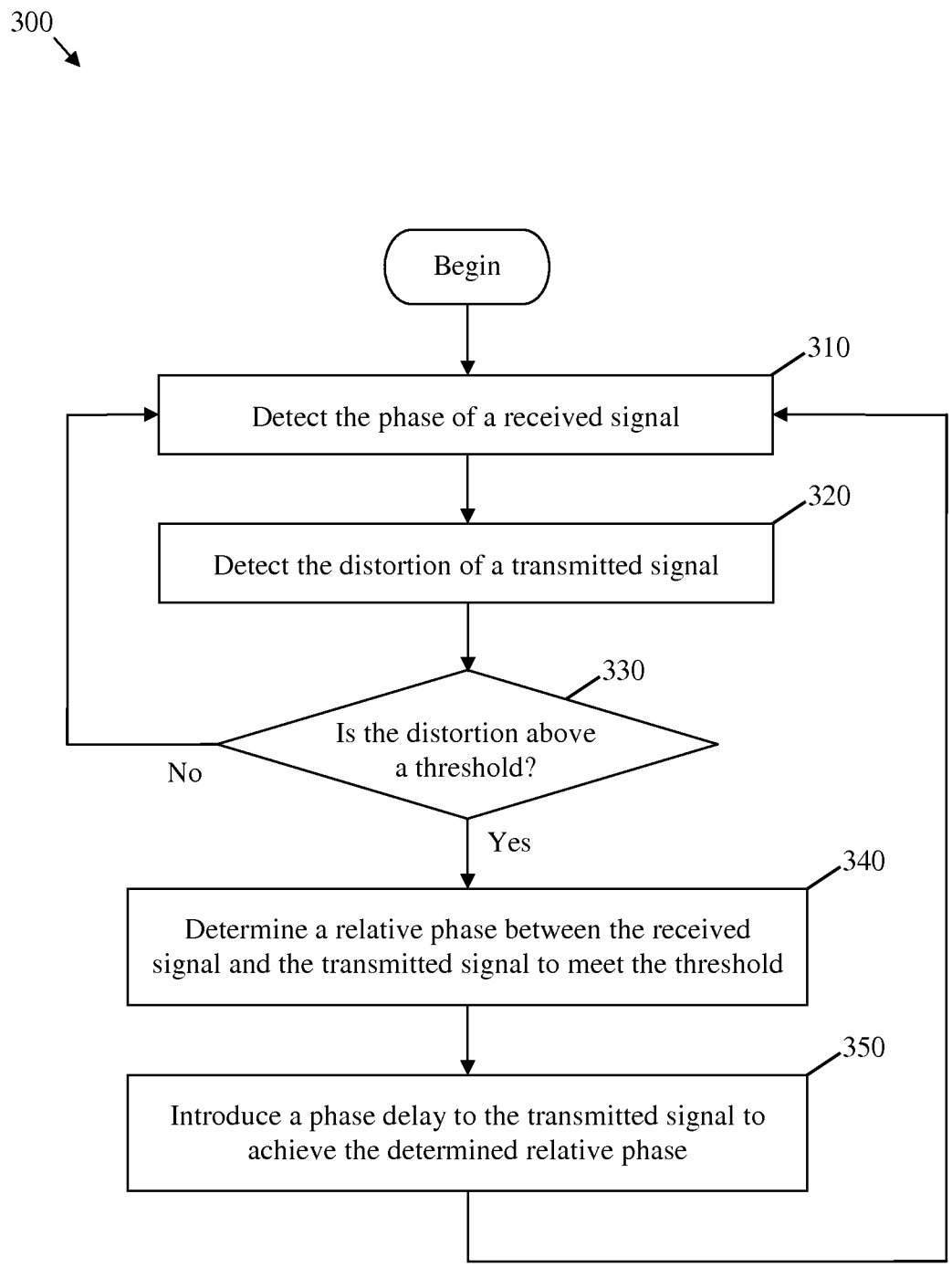
FIG. 3 is a flowchart of an embodiment of a transmission phase control method.

FIG. 3 illustrates an embodiment of a transmission phase control method 300, which may be implemented to reduce or eliminate distortion in transmitted signals of an echo cancel based full duplex transmission system. The echo cancel based full duplex transmission system may also be a loop-timed clocking system, such as the loop-timed clocking system 100. For instance, the transmission phase control method 300 may be implemented at the slave node 110. The method 300 may begin at block 310, where the phase of a received signal may be detected. For instance, the first PLL circuit 118 may detect the phase of the received signal in the first receiver 114 (based on the slave clock). At block 320, the distortion of the transmitted signal may be detected. For instance a DFE and/or error detecting circuitry may detect the signal to noise ratio (SNR) or power of the transmitted signal in the first transmitter 112 and obtain the distortion level (e.g., in mV). At block 330, the method 300 may determine whether the distortion is above a threshold. The threshold may be a target or maximum allowed value for the distortion in the transmitted signal, such as the 9 mV threshold in FIG. 2. If the condition of block 330 is true, then the method 300 may proceed to block 340. Otherwise, the method 300 may return to block 310 to continue detecting the received signal and the transmitted signal.

At block 340, a relative phase between the received signal and the transmitted signal may be determined to meet the threshold. The relative phase may correspond to the difference between the received signal phase and the transmitted signal phase (RX-TX) that causes a distortion in the transmitted signal below the threshold. At block 350, a phase delay may be introduced to the transmitted signal to achieve the determined relative phase. For instance, the phase delay circuit 119 may introduce the phase delay to the first transmitter 112. The method 300 may then return to block 310 to continue detecting the received signal and the transmitted signal. As such, the steps of the method 300 may be implemented in a continuous or recurring manner to maintain the distortion in the transmitted signal at or below the threshold.

The transmission phase control method 300 may be implemented at start-up time to adjust the relative phase and hence the distortion level in the exchanged signal between a slave node and a master node (e.g., the slave node 110 and master node 120) and may subsequently maintain the distortion level during normal operation time. By controlling the transmitter phase at the slave side, the method 300 may present an acceptable tradeoff between performance (in terms of signal quality) and power consumption in the echo cancel based full duplex transmission system. In an embodiment, the transmission phase control method 300 may also be implemented at the master node (e.g., using the 1/N divider circuit 129) to reduce or maintain distortion in the transmitted signal below a threshold.

In systems that implement the loop timing scheme, such as the loop-timed clocking system 100, a slave node and a master node may exchange information about the local receiver status and the remote receiver status at the two ends, as described below. The status information may be exchanged at start-up time prior to normal operation time. For instance, the status information may be exchanged between the slave node and the master node based on a physical layer (PHY) control state diagram described in IEEE 802.3ab-1000BASE-T. The PHY control state diagram may comprise exchanging the local receiver status and the remote receiver status between the slave node and the master node, e.g., via a back channel in the data frame format. The PHY control state diagram may be implemented (using hardware, software, or both) after the adaptive components of the system are adapted and the local receiver (at each of the nodes) becomes capable of sensing or obtaining the status of the remote end (at the other node). In an embodiment, the PHY control state diagram may be modified to include transmitter phase control at the slave node by incorporating the transmission phase control method 300 into the PHY control state diagram, as described below.

Figure 4:
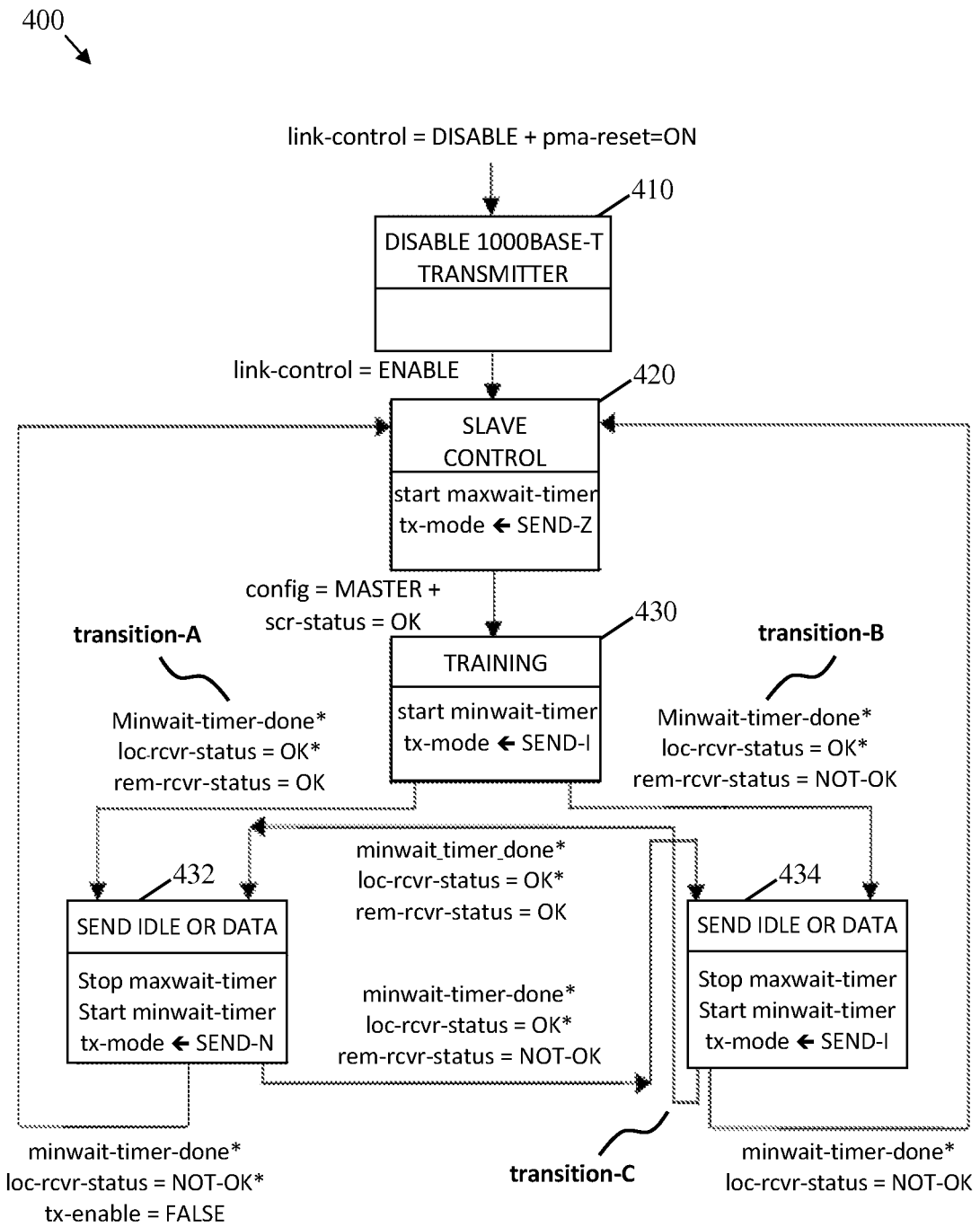
FIG. 4 is a schematic diagram of an embodiment of a control state machine.

FIG. 4 illustrates an embodiment of a control state machine 400, which may be implemented by the slave node according to the PHY control state diagram described in IEEE 802.3ab. The PHY control state diagram may include exchanging status bits (or flags) for the local receiver status (loc-rcvr-status) and the remote receiver status (rem-rcvr-status). The loc-rcvr-status, and similarly the rem-rcvr-status, may be set to the "ok" status to indicate that the receiver phase is matched to the transmitter phase at the other end. Alternatively, the loc-rcvr-status, and similarly the rem-rcvr-status, may be set to the "not ok" status to indicate that the receiver phase is not matched to the transmitter phase at the other end.

The control state machine 400 may begin at block 410, where the transmitter at the slave node may be disabled. At block 420, the slave node may enter a silent state by starting a wait timer (maxwait-timer). At block 430, the slave node may enter a training state by starting a second wait timer (minwait-timer). At the training state, different cases for the exchanged loc-rcvr-status and rem-rcvr-status may be considered. In a first case (case-1), where both the exchanged loc-rcvr-status and rem-rcvr-status may be set to "ok", the control state machine 400 may proceed to block 432 after the second wait timer expires (minwait-timer). This is referred to as transition-A in FIG. 4. Case-1 may correspond to the situation where the transmitter phase at the slave node is acceptable by the master node. Alternatively, in a second case (case-2), where the exchanged loc-rcvr-status may be set to "ok" and the rem-rcvr-status may be set to "not ok", the control state machine 400 may proceed to block 434 after the second wait timer expires (minwait-timer). This is referred to as transition-B in FIG. 4. Case-2 may correspond to the situation where the transmitter phase at the slave node is not acceptable to the master node and may need to be adjusted. For this case, the IEEE 802.3ab PHY control state diagram may be modified to control or adjust the transmitter phase, for instance using the transmission phase control method 300, as described in detail below.

At block 432, the slave node may enter a normal operation state (SEND IDLE OR DATA state) and hence begin to transmit data. During this state, if the exchanged loc-rcvr-status becomes "not ok", then the control state machine 400 may return to block 420 (the silent state). Alternatively, if the exchanged rem-rcvr-status becomes "not ok", then the control state machine 400 may proceed to block 434. At block 434, the slave node may enter an idle state (SEND IDLE state) and hence may be idle and may not transmit data. During this state, if the exchanged loc-rcvr-status becomes "not ok", then the control state machine 400 may return to block 420 (the silent state). Alternatively, if the exchanged rem-rcvr-status becomes "ok", then the control state machine 400 may proceed to block 432. This is referred to as transition-C in FIG. 4. The parameters and commands shown in FIG. 4 may be described in detail for the PHY control state diagram in IEEE 802.3ab. The PHY control state diagram may also be implemented at the master node to determine a best (or improved) phase for transmissions between the two nodes.

Figure 5:
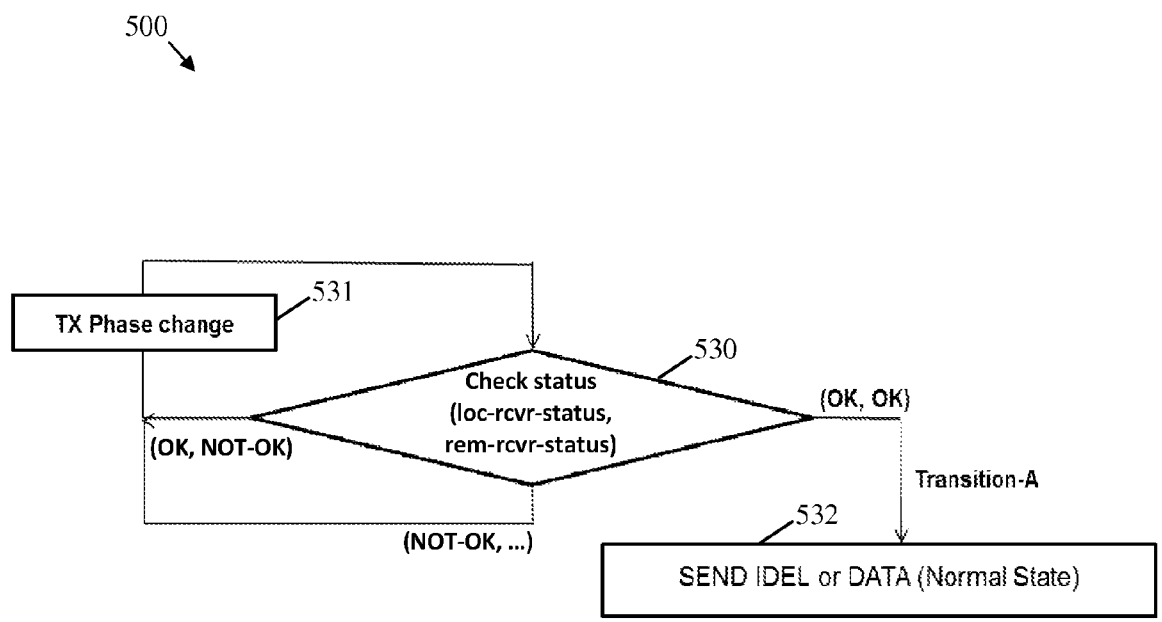
FIG. 5 is a schematic diagram of an embodiment of a sub-state of the control state machine of FIG. 4.

FIG. 5 illustrates an embodiment of a sub-state 500 that may be added to the control state machine 400 (or the IEEE 802.3ab PHY control state diagram) to incorporate transmitter phase control, such as using the transmission phase control method 300. The sub-state 500 may be added to the training state (block 430) of the PHY control state diagram. The sub-state 500 may comprise blocks 530 and 531, which may be added to block 430 of the control state machine 400. At block 530, the sub-state 500 (at the slave node) may check each of loc-rcvr-status and rem-rcvr-status. If the exchanged loc-rcvr-status is set to "not ok", then the sub-state 500 may proceed to block 531. The sub-state 500 may also proceed to block 531 if the exchanged loc-rcvr-status is set to "ok" and the rem-rcvr-status is set to "not ok". This second case may correspond to case-2 above. Alternatively, if both loc-rcvr-status and rem-rcvr-status are set to "ok", then the sub-state 500 may proceed to block 532, which may correspond to block 432 (or the normal operation state) in transition-A above. At block 531, the slave node may implement transmitter phase change or control, for instance using the transmission phase control method 300. The change or adjustment to the transmitter phase at the slave node may be fractional relative to a transmitted symbol period.

Adjusting the transmitter phase at block 531 within the training state may avoid reaching a situation where loc-rcvr-status or loc-rcvr-status becomes set to "not ok" and thus restarting from the silent state (or block 420) of the PHY control state diagram. This may increase the process of synchronizing the phases between the slave node and the master node and hence begin normal transmission or operation. Further, the transmitter phase may be adjusted to a determined value such that the relative phase between receiver and transmitter (RX-TX) may meet the target or threshold for transmitter distortion, as described above. For instance, the transmitter phase may be adjusted such that RX-TX is about 0.5 UI in the scenario of FIG. 2. In this situation, both the master side and the slave side may settle in a reliable operation state of the control state machine 400, e.g., after a few trials of different transmitter phase. When the control state machine 400, including the sub-state 500, is implemented by both the slave node and the master node, e.g., at start-up time, both nodes may achieve a best (or improved) phase for transmissions and a suitable tradeoff between performance (in terms of signal quality) and power consumption at both nodes.

Figure 6:
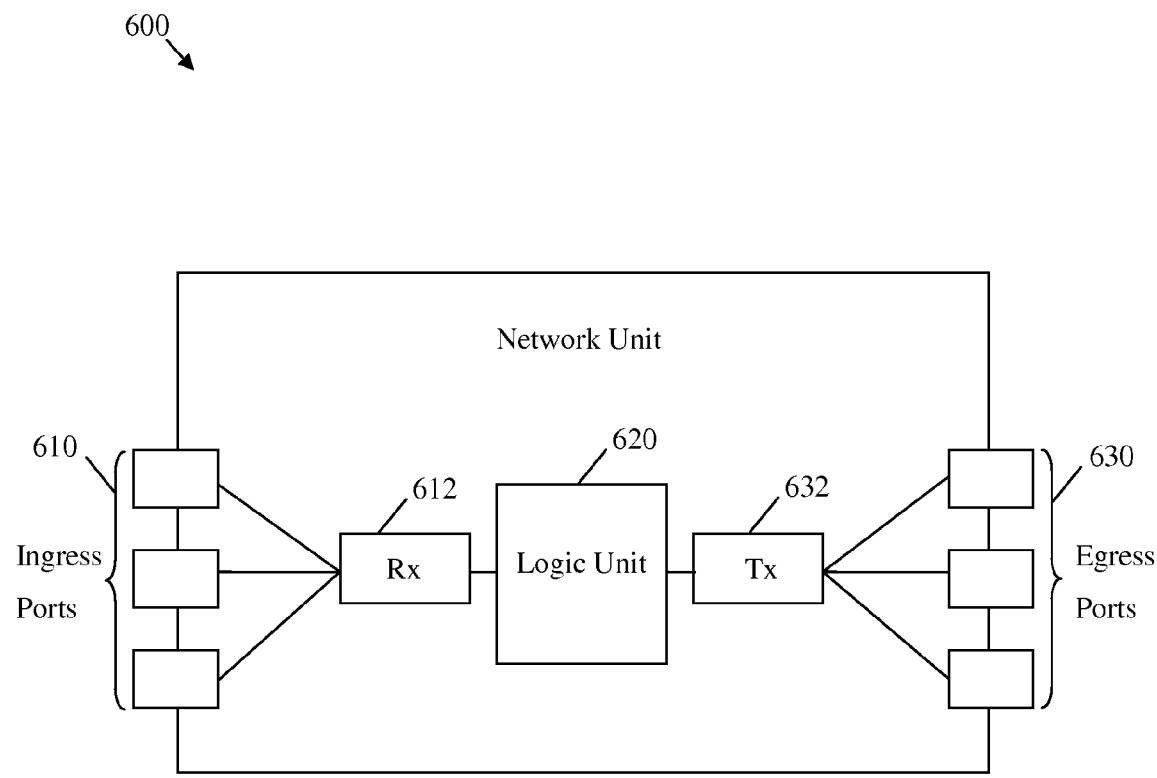
FIG. 6 is a schematic diagram of an embodiment of a network unit.

FIG. 6 illustrates an embodiment of a network unit 600, which may be any device that transports and processes data in a network, such as a switch, a router, or other network nodes. For instance, the network unit 600 may correspond to the slave node 110 or the master node 120. The network unit 600 may comprise one or more ingress ports or units 610 coupled to a receiver (Rx) 612 for receiving signals and frames/data from other network components. The network unit 600 may comprise a logic unit 620 to determine to which network components to send the packets. The logic unit 620 may be implemented using hardware, software, or both. The logic unit 620 may also be configured to implement or support the transmission phase control method 300, the control state machine 400, and the sub-state 500. The network unit 600 may also comprise one or more egress ports or units 630 coupled to a transmitter (Tx) 632 for transmitting signals and frames/data to the other network components. The components of the network unit 600 may be arranged as shown in FIG. 6.

Figure 7:
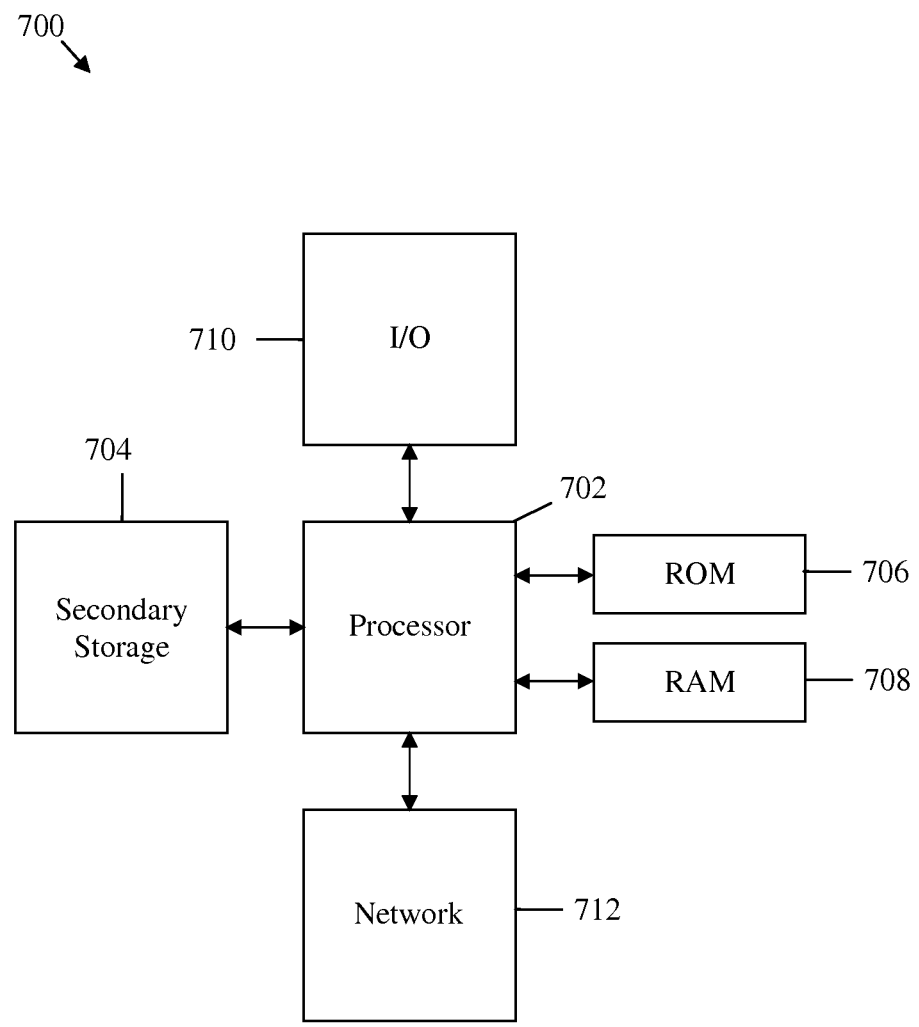
FIG. 7 is a schematic diagram of an embodiment of a general-purpose computer system.

FIG. 7 illustrates a typical, general-purpose network component 700 that may correspond to or may be part of a network component, such as a server, a switch, a router, or any other network nodes. The network component 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The general-purpose network component 700 may also comprise, at the processor 702 and or any of the other components of the general-purpose network component 700.

The processor 702 may be implemented as one or more CPU chips, or may be part of one or more application specific integrated circuits (ASICs) and/or digital signal processors (DSPs). The processor 702 may comprise or correspond to the logic unit 620 and may be configured to implement or support the transmission phase control method 300, the control state machine 400, and the sub-state 500. The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a transmitter configured to transmit data at a transmitter phase;
   a receiver configured to receive data at a receiver phase; and
   a phase delay component coupled to the transmitter and the receiver and configured to control the transmitter phase relative to the receiver phase to maintain distortion in the transmitted data below a threshold,
   wherein the threshold is less than a maximum possible distortion in the transmitted data.

2. The apparatus of claim 1 further comprising an echo canceller coupled to the transmitter and the receiver and configured to cancel at least a linear portion of a leaked signal from the transmitter to the receiver, wherein distortion in the leaked signal is proportional to the distortion in the transmitted data.

3. The apparatus of claim 2, wherein both the distortion in the transmitted data and the distortion in the leaked signal vary in a non-linear manner with the difference between the transmitter phase and the receiver phase.

4. The apparatus of claim 3, wherein the threshold is about half of the maximum possible distortion in the transmitted data that occurs at a non-zero difference value between the transmitter phase and the receiver phase due to a processing delay.

5. The apparatus of claim 1 further comprising:
   a slave clock configured to synchronize with a master clock at a network node that is coupled to the transmitter and receiver via a full duplex channel; and
   a phase-locked-loop (PLL) component coupled to the slave clock, the receiver, and the phase delay component and configured to track the receiver phase based on the slave clock and indicate the receiver phase to the phase delay component.

6. The apparatus of claim 5, wherein the slave clock is configured to synchronize with the master clock using a time loop scheme as described in the Institute of Electrical and Electronics Engineers (IEEE) standard 802.3ab.

7. The apparatus of claim 5, wherein the network node comprising the master clock further comprises:

a second transmitter configured to transmit data at a second transmitter phase;
a second receiver configured to receive data at a second receiver phase;
a second phase delay component coupled to the second transmitter and the master clock and configured to control the second transmitter phase relative to the second receiver phase to maintain distortion in the transmitted data below the determined threshold; and
a second PLL component coupled to the master clock and the second receiver and configured to track the second receiver phase based on the master clock and indicate the second receiver phase to the second phase delay component.

8. The apparatus of claim 1, wherein the transmitter is controlled based on receiver status information exchanged with the master node that indicates whether a best phase is detected for a local receiver and a remote receiver.

9. A network component for an echo cancel based full duplex transmission system, comprising:
a transmitter configured to transmit data to a master node at a slave transmitter phase via a full duplex channel;
a receiver configured to receive data from the master node at a slave receiver phase via the full duplex channel; and
a processor configured to adjust the slave transmitter phase with respect to the slave receiver phase based on status information exchanged with the master node.

10. The network component of claim 9, wherein the slave transmitter phase is adjusted during a start-up time that initiates communications over the full duplex channel between the network component and the master node.

11. The network component of claim 9, wherein the data is transmitted using an AB class line driver to reduce power consumption, and wherein the slave transmitter phase is adjusted with respect to the slave receiver phase to reduce distortion in transmissions due to using the AB class line driver.

12. The network component of claim 9, wherein the master node also adjusts a master transmitter phase of a local master transmitter with respect to a master receiver phase of a local master receiver based on the exchanged status information.

13. The network component of claim 12, wherein the status information indicates whether the slave receiver phase is matched to the master transmitter phase and whether the master receiver phase is matched to the slave transmitter phase.

14. The network component of claim 9, wherein the slave transmitter phase is adjusted at a fraction of a transmitted symbol period of the slave transmitter.

15. A method implemented by at least one of a slave node and a master node in an echo cancel based full duplex transmission system that implements a loop timing scheme, comprising:
detecting a phase of a received signal;
detecting a distortion level of a transmitted signal;
determining a relative phase between the received signal and the transmitted signal that meets a threshold if the detected distortion level is above the threshold; and
introducing a phase delay to the transmitted signal to achieve the determined relative phase between the received signal and the transmitted signal and lower the distortion level below the threshold.

16. The method of claim 15, wherein the phase delay is introduced to the transmitted signal to achieve the determined relative phase during a training state of a physical layer (PHY) control state machine described in the Institute of Electrical and Electronics Engineers (IEEE) standard 802.3ab that exchanges a local receiver status and a remote receiver status between the slave node and the master node.

17. The method of claim 16, wherein the local receiver status is set to ok when a local receiver phase is matched to a remote transmitter phase and set to not ok otherwise, and wherein the remote receiver status is set to ok when a remote receiver phase is matched to a local transmitter phase and set to not ok otherwise.

18. The method of claim 17, wherein introducing the phase delay to the transmitted signal during the training state avoids reaching a situation where both the local receiver status and the remote receiver status are set to not ok which prompts to restart the PHY control state machine from an initial silent state.

19. The method of claim 17, wherein the phase delay is introduced to the transmitted signal if the local receiver status is set to not ok.

20. The method of claim 17, wherein the phase delay is introduced to the transmitted signal if the local receiver status is set to ok and the remote receiver status is set to not ok.

* * * * *